(12) United States Patent
Chiffey et al.

(10) Patent No.: US 9,643,160 B2
(45) Date of Patent: May 9, 2017

(54) ELECTRICALLY HEATED CATALYST FOR A COMPRESSION IGNITION ENGINE

(71) Applicant: Johnson Matthey Public Limited Company, London (GB)

(72) Inventors: Andrew Francis Chiffey, Ware (GB); John Benjamin Goodwin, Royston (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 14/489,673

(22) Filed: Sep. 18, 2014

(65) Prior Publication Data

US 2015/0087497 A1    Mar. 26, 2015

(30) Foreign Application Priority Data

Sep. 20, 2013  (GB) .................................. 1316790.3

(51) Int. Cl.
*F01N 3/10*  (2006.01)
*B01D 50/00*  (2006.01)
(Continued)

(52) U.S. Cl.
CPC ............... *B01J 23/44* (2013.01); *B01J 21/04* (2013.01); *B01J 21/12* (2013.01); *B01J 23/42* (2013.01); *F01N 3/10* (2013.01); *F01N 3/103* (2013.01); *F01N 3/105* (2013.01); *F01N 3/2006* (2013.01); *F01N 3/2013* (2013.01); *F01N 3/2026* (2013.01); *F01N 13/0093* (2014.06);
(Continued)

(58) Field of Classification Search
CPC ... B01J 21/04; B01J 23/40; B01J 23/42; B01J 23/44; B01J 23/46; B01D 53/92; F01N 3/2885
USPC .. 502/327, 332–334, 339, 355, 439, 527.12, 502/527.13; 422/170, 177, 180; 60/299
See application file for complete search history.

(56) References Cited

U.S. PATENT DOCUMENTS

| 4,300,956 A | 11/1981 | Rosenberger et al. |
| 5,010,051 A * | 4/1991 | Rudy .................. B01D 53/945 423/213.5 |

(Continued)

FOREIGN PATENT DOCUMENTS

| EP | 0579415 | 1/1994 |
| EP | 0635627 A2 | 1/1995 |

(Continued)

OTHER PUBLICATIONS

UKIPO Search Report dated Apr. 25, 2014 for corresponding Application No. GB1316790.3 filed Sep. 20, 2013.

*Primary Examiner* — Cam N. Nguyen
(74) *Attorney, Agent, or Firm* — Gary D. Mangels

(57) ABSTRACT

An emissions control device for a compression ignition engine is described. The emissions control device comprises: (a) a first catalyst comprising an electrically heatable substrate and a first composition disposed on the electrically heatable substrate, wherein the first composition comprises alumina and a first platinum group metal (PGM); and (b) a second catalyst comprising a substrate and a second composition disposed on the substrate, wherein the second composition comprises alumina and a second platinum group metal (PGM); wherein the loading of the first composition is less than the loading of the second composition.

16 Claims, 1 Drawing Sheet

(51) Int. Cl.
*B01D 53/34* (2006.01)
*B01J 23/00* (2006.01)
*B01J 23/02* (2006.01)
*B01J 23/08* (2006.01)
*B01J 23/40* (2006.01)
*B01J 23/42* (2006.01)
*B01J 23/44* (2006.01)
*B01J 23/56* (2006.01)
*B01J 21/04* (2006.01)
*F01N 3/20* (2006.01)
*F01N 13/00* (2010.01)
*B01J 21/12* (2006.01)

(52) U.S. Cl.
CPC ...... *F01N 13/0097* (2014.06); *F01N 2330/02* (2013.01); *Y02T 10/26* (2013.01)

(56) References Cited

U.S. PATENT DOCUMENTS

| | | | |
|---|---|---|---|
| 5,045,519 A | 9/1991 | Meyer et al. | |
| 5,146,743 A | 9/1992 | Maus et al. | |
| 5,376,610 A * | 12/1994 | Takahata | B01J 37/0244 423/213.7 |
| 5,441,706 A | 8/1995 | Whittenberger | |
| 5,465,573 A | 11/1995 | Abe et al. | |
| 5,552,360 A * | 9/1996 | Farrauto | F23C 13/00 431/7 |
| 5,887,426 A | 3/1999 | Brück | |
| 5,979,157 A | 11/1999 | Kinugasa et al. | |
| 6,071,850 A * | 6/2000 | Friedman | B01J 37/0225 502/303 |
| 6,080,375 A * | 6/2000 | Mussmann | B01D 53/944 423/212 |
| 6,087,295 A * | 7/2000 | Kharas | B01D 53/9418 423/213.5 |
| 6,217,837 B1 | 4/2001 | Narula et al. | |
| 6,239,064 B1 * | 5/2001 | Nguyen | B01D 53/8662 502/304 |
| 6,338,831 B1 | 1/2002 | Strehlau et al. | |
| 6,513,324 B2 | 2/2003 | Brück et al. | |
| 6,517,795 B1 | 2/2003 | Noweck et al. | |
| 7,329,629 B2 * | 2/2008 | Gandhi | B01D 53/945 502/304 |
| 7,375,056 B2 * | 5/2008 | Wei | B01D 53/945 502/439 |
| 7,534,738 B2 * | 5/2009 | Fujdala | B01D 53/945 427/419.3 |
| 7,722,829 B2 * | 5/2010 | Punke | B01D 53/944 422/180 |
| 7,727,498 B2 | 6/2010 | Hodgson et al. | |
| 7,875,250 B2 * | 1/2011 | Nunan | B01D 53/945 422/168 |
| 7,977,275 B2 * | 7/2011 | Pfeifer | B01D 46/0001 502/178 |
| 8,006,485 B2 * | 8/2011 | Twigg | B01D 53/945 60/274 |
| 8,066,963 B2 * | 11/2011 | Klingmann | B01D 53/944 423/212 |
| 8,505,282 B2 | 8/2013 | Gonze et al. | |
| 8,640,440 B2 * | 2/2014 | Klingmann | B01D 53/944 422/170 |
| 8,652,429 B2 * | 2/2014 | Sumiya | B01J 37/0244 423/213.2 |
| 8,667,785 B2 * | 3/2014 | Blakeman | B01J 35/0006 423/213.5 |
| 8,668,891 B2 * | 3/2014 | Blakeman | F01N 3/0828 423/213.5 |
| 8,828,900 B2 * | 9/2014 | Takagi | B01D 53/945 502/327 |
| 9,005,559 B2 * | 4/2015 | Sumiya | B01J 37/0244 423/213.2 |
| 9,046,022 B2 * | 6/2015 | Blakeman | B01J 35/0006 |
| 9,175,590 B2 | 11/2015 | Umemoto et al. | |
| 9,227,176 B2 * | 1/2016 | Andersen | B01J 37/0244 |
| 2011/0271664 A1 * | 11/2011 | Boorse | B01D 53/9468 60/301 |
| 2012/0011834 A1 | 1/2012 | Sobue | |
| 2013/0089481 A1 * | 4/2013 | Sumiya | B01J 37/0244 423/213.5 |
| 2013/0136659 A1 | 5/2013 | Umemoto et al. | |
| 2013/0149223 A1 * | 6/2013 | Blakeman | B01J 35/0006 423/213.5 |
| 2014/0147359 A1 * | 5/2014 | Bergeal | B01D 53/945 423/213.5 |
| 2014/0212350 A1 * | 7/2014 | Andersen | B01J 23/6527 423/237 |
| 2014/0274676 A1 * | 9/2014 | Liu | B01J 23/63 502/304 |
| 2015/0037233 A1 * | 2/2015 | Fedeyko | B01D 53/8628 423/239.1 |

FOREIGN PATENT DOCUMENTS

| | | |
|---|---|---|
| EP | 0824182 A1 | 2/1998 |
| EP | 0945165 | 9/1999 |
| EP | 1057519 | 12/2000 |
| EP | 1211393 | 6/2002 |
| EP | 2623738 A1 | 8/2013 |
| WO | 9947260 | 9/1999 |
| WO | 0180978 | 11/2001 |
| WO | 2007077462 | 7/2007 |
| WO | 2011080525 | 7/2011 |

* cited by examiner

ELECTRICALLY HEATED CATALYST FOR A COMPRESSION IGNITION ENGINE

CROSS REFERENCE TO RELATED APPLICATIONS

This application claims priority benefit to Great Britain Patent Application No. 1316790.3 filed on Sep. 20, 2013, which is incorporated herein by reference.

FIELD OF THE INVENTION

The invention relates to an emissions control device for a compression ignition engine, such as a diesel engine. The invention also relates to an exhaust system for a compression ignition engine and a vehicle comprising a compression ignition engine.

BACKGROUND TO THE INVENTION

Compression ignition engines produce an exhaust emission that generally contains at least four classes of pollutant that are legislated against by inter-governmental organisations throughout the world: carbon monoxide (CO), unburned hydrocarbons (HCs), oxides of nitrogen ($NO_x$) and particulate matter (PM). Emissions control devices known as oxidation catalysts (or diesel oxidation catalysts) are commonly used to treat carbon monoxide (CO) and hydrocarbons (HCs), including the volatile organic fraction (VOF) of particulate matter (PM), in exhaust emissions produced by compression ignition engines. Such catalysts treat carbon monoxide (CO) by oxidising it to carbon dioxide ($CO_2$), and treat hydrocarbons (HCs) by oxidising them to water ($H_2O$) and carbon dioxide ($CO_2$).

Oxidation catalysts for compression ignition engines typically comprise platinum group metals (PGMs) and a support material, which have been coated onto a substrate. However, oxidation catalysts take several minutes to heat up to their effective operating temperature from a cold start, and in that time a significant amount of pollutant can be emitted into the air.

One way of bringing the oxidation catalyst up to its effective operating temperature is to incorporate an electrical heater into the exhaust system or the emissions control device. For example, EP 0579415 A1 describes an upstream heater for a catalyst in an exhaust system. The exhaust system contains a catalyst for the treatment of exhaust gas to combat air pollution, and a non-catalytic heater upstream of the catalyst to reduce the time it takes the catalyst to reach its effective reaction temperature. The heater has at least 15 heated channels per square cm, as measured at right angles to the gas flow through them, the heated channels being less than 1.0 cm in length, so that in operation the gas passes through the channels, and is thereby heated before it reaches the catalyst.

SUMMARY OF THE INVENTION

Oxidation catalysts comprising the combination of a PGM and an alumina based support material show good oxidative activity toward carbon monoxide (CO) and hydrocarbons (HCs) in the exhaust gas produced by a compression ignition engine. However, such catalysts take a significant amount of time to heat up to their effective operating temperature (e.g. light off temperature) from a cold start. The catalyst may also cool to a temperature below its effective operating temperature during idling of a vehicle or when used with a vehicle having an engine with a stop/start mode.

Platinum group metals, such as platinum and palladium, are expensive constituents of emissions control devices. With environmental legislation becoming increasingly more stringent, there is pressure on the manufacturers to provide emissions control devices having enhanced activity without increasing the platinum group metal content of the oxidation catalyst.

The present invention concerns oxidation catalysts for compression ignition engines that comprise the combination of both a platinum group metal (PGM) and an alumina based support material. Accordingly, the invention provides an emissions control device for a compression ignition engine comprising:

(a) a first catalyst comprising an electrically heatable substrate and a first composition disposed on the electrically heatable substrate, wherein the first composition comprises alumina and a first platinum group metal (PGM);

(b) a second catalyst comprising a substrate and a second composition disposed on the substrate, wherein the second composition comprises alumina and a second platinum group metal (PGM); and wherein the loading of the first composition is less than the loading of the second composition.

To make use of the volume provided by the electrically heatable substrate, a catalytically active composition is included on the electrically heatable substrate. The inventors further realised that alumina is a thermal insulator. In fact, the specific heat capacity of alumina is relatively high (reportedly around 760 to 900 J/kg·K) compared to other support materials that are commonly used in oxidation catalysts. It is thought that the lower thermal mass of the alumina based support material on the electrically heated substrate compared to the main substrate aids heat transfer from the electrical heating elements.

The combination of an electrically heated substrate coated with a composition comprising a PGM can bring about a rapid increase in the temperature of the exhaust system, such that the second catalyst is rapidly brought up to its effective operating temperature after a cold start. This means that the emissions control device can oxidise carbon monoxide (CO), hydrocarbons (HCs) and nitrogen oxides ($NO_x$) much sooner after starting the engine from cold. As a result, there may be a reduction in the overall amount of CO and HCs that are emitted into the atmosphere (e.g. as measure over a standard drive cycle) directly from the emissions control device compared to a conventional oxidation catalyst having the same overall amount of platinum and palladium.

The first catalyst in the emissions control device of the invention can also maintain the temperature of the second catalyst at or above its effective operating temperature when exhaust gas temperatures start to decrease, such as during vehicular idling, or when the compression ignition engine has been temporarily stopped. The presence of a catalytically active coating (e.g. the first composition) on the electrically heatable substrate may also reduce the overall electrical power consumption of the substrate because the coating itself will generate an exotherm when it reaches its effective operating temperature.

The invention further provides an exhaust system for a compression ignition engine. The exhaust system comprises the emissions control device of the invention.

The invention further relates to a vehicle. The vehicle comprises a compression ignition engine and either the emissions control device of the invention or the exhaust system of the invention.

A further aspect of the invention relates to the use of an emissions control device for treating an exhaust gas produced by a compression ignition engine, wherein the emissions control device comprises:

(a) a first catalyst comprising an electrically heatable substrate and a first composition disposed on the electrically heatable substrate, wherein the first composition comprises alumina and a first platinum group metal (PGM);

(b) a second catalyst comprising a substrate and a second composition disposed on the substrate, wherein the second composition comprises alumina and a second platinum group metal (PGM); and wherein the loading of the first composition is less than the loading of the second composition.

The invention further provides a method of treating an exhaust gas produced by a compression ignition engine, wherein the method comprises passing the exhaust gas through an emissions control device of the invention.

Any reference to treating an exhaust gas produced by a compression ignition engine encompasses treating (e.g. oxidising) carbon monoxide (CO) and hydrocarbons (HCs) in the exhaust gas, such as by oxidising carbon monoxide (CO), hydrocarbons (HCs) and nitric oxide (NO).

DETAILED DESCRIPTION OF THE INVENTION

Figure 1:
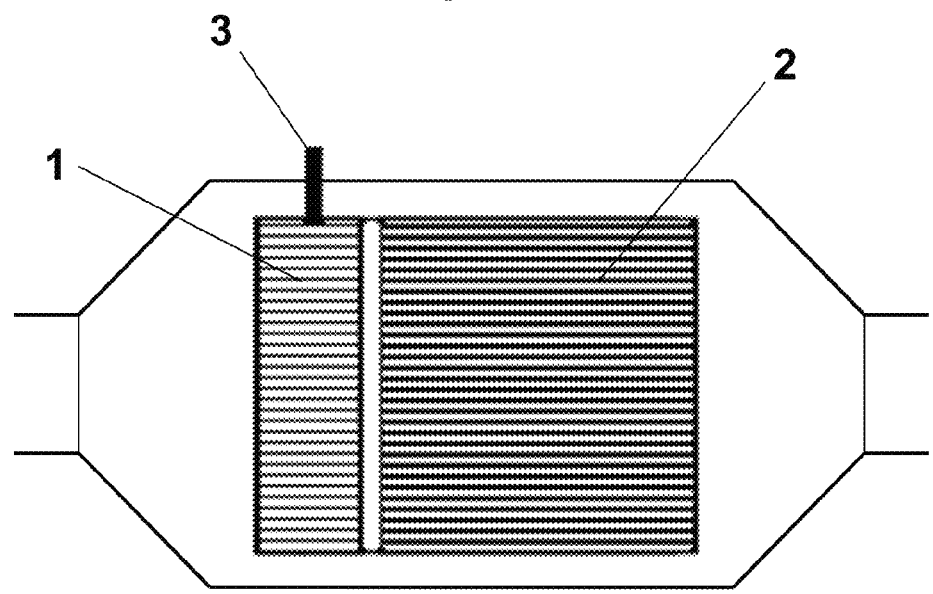
FIG. 1 shows an emissions control device in accordance with the invention, which has an electrically heatable substrate or heating disk (1) coated with a first catalytically active composition and a substrate (2) coated with a second catalytically active composition. A power supply may be electrically connected to electrode (3).

By electrically heating the first catalyst, the first composition is rapidly brought up to its effective temperature (e.g. its light off temperature). This occurs much more quickly than relying on the thermal transfer from the exhaust gas passing through the catalyst to the substrate. When the first catalyst has reached its effective temperature, it can start to catalyse exothermic reactions (e.g. oxidation of CO and/or hydrocarbons). The heat that is generated can assist in bringing the second catalyst up to its effective operating temperature.

The emissions control device of the invention is suitable for a compression ignition engine, particularly a diesel engine. The temperature of exhaust gases produced by compression ignition engines is generally lower than the temperature of exhaust gases produced by spark ignition engines (e.g. gasoline spark ignition engines) of the same capacity. In principle, the emissions control device of the invention could be used for treating the exhaust gas produced by a spark ignition engine in territories such as California, where rapidly heating up the exhaust gas after engine start up would assist in meeting the environmental legislative requirements. However, the emissions control device of the invention is particularly beneficial for compression ignition engines, such as diesel engines.

The emissions control device comprises a first catalyst and a second catalyst. The emissions control device may consist of the first catalyst and the second catalyst.

In general, the first catalyst and the second catalyst are oxidation catalysts. Thus, the first catalyst and/or the second catalyst is for the oxidising carbon monoxide (CO), hydrocarbons (HCs) and optionally oxides of nitrogen ($NO_x$) in an exhaust gas produced by a compression ignition engine. Typically, the first catalyst is for use as a diesel oxidation catalyst (DOC).

The first catalyst comprises an electrically heatable substrate and a first composition disposed on the electrically heatable substrate. The first catalyst generally comprises a single electrically heatable substrate. Thus, the first catalyst may consist of the electrically heatable substrate and the first composition. The first catalyst typically comprises an electrical power connection, preferably at least two electrical power connections, more preferably only two electrical power connections. Each electrical power connection may be electrically connected to the electrically heatable substrate and an electrical power source. The first catalyst can be heated by Joule heating, where an electric current through a resistor converts electrical energy into heat energy.

The electrically heatable substrate is an electrically heating substrate, in use.

In general, the electrically heatable substrate comprises a metal. The metal may be electrically connected to the electrical power connection or electrical power connections.

In principle, any electrically heatable substrate may be used. Examples of electrically heatable substrates are described in U.S. Pat. No. 4,300,956, U.S. Pat. No. 5,146,743 and U.S. Pat. No. 6,513,324. Typically, the electrically heatable substrate is an electrically heatable honeycomb substrate. The electrically heatable substrate may be an electrically heating honeycomb substrate, in use.

The electrically heatable honeycomb substrate may comprise a metal monolith. The metal monolith may comprise a corrugated metal sheet or foil. The corrugated metal sheet or foil may be rolled, wound or stacked. When the corrugated metal sheet is rolled or wound, then it may be rolled or wound into a coil, a spiral shape or a concentric pattern.

The metal of the electrically heatable substrate, the metal monolith and/or the corrugated metal sheet or foil may comprise an aluminium ferritic steel, such as Fecralloy®.

The electrically heatable substrate may comprise a heating disk. In general, the heating disk is wound to avoid an electrical short circuit from the anode to cathode.

In general, the cell density of the electrically heatable substrate is lower than the cell density of the substrate of the second catalyst.

The electrically heatable substrate may have a cell density of 50 to 200 cells per square inch (cpsi), preferably 75 to 175 cpsi.

Typically, the axial length of the electrically heatable substrate is less than the axial length of the substrate of the second catalyst. The axial length of the electrically heatable substrate may be less than 15% of the axial length of the substrate of the second catalyst. It is preferred that the axial length of the electrically heatable substrate is less than 14%, such as less than 13% (e.g. less than 10%), of the axial length of the substrate of the second catalyst.

Typically, the first composition is directly disposed on a surface of the electrically heatable substrate. Normally, the first composition is directly disposed on a surface of the channel walls of the electrically heatable substrate. This may be achieved by coating a washcoat comprising the first composition onto the electrically heatable substrate.

In principle, the first composition may comprise a plurality of layers and/or zones. It is preferred that the first composition comprises, or consists of, a single layer.

In the emissions control device of the invention, the first composition comprises alumina and a first platinum group metal (PGM). In general, it is preferred that the first composition comprises a first PGM and a first support material, wherein the first support material comprises alumina. The first composition may comprise, or consist essentially of, the first PGM and the first support material.

The first support material may comprise, or consist essentially of, a mixed oxide of alumina and a refractory oxide or a composite oxide of alumina and a refractory oxide, wherein the refractory oxide is selected from the group consisting of silica, titania, zirconia and ceria. It is preferred that the refractory oxide is silica.

When the first support material comprises, or consists essentially of, a mixed oxide of alumina and a refractory oxide or a composite oxide of alumina and a refractory oxide, then preferably the first support material (e.g. the mixed oxide or the composite oxide) comprises at least 50 to 99% by weight of alumina, more preferably 70 to 95% by weight of alumina, even more preferably 75 to 90% by weight of alumina.

The first support material comprises alumina or may consist essentially of alumina. The alumina can be $\alpha$-$Al_2O_3$, $\beta$-$Al_2O_3$, or $\gamma$-$Al_2O_3$. It is preferred that the alumina comprises, or consists essentially of, $\gamma$-$Al_2O_3$.

The first support material may comprise alumina doped with a dopant. The inclusion of a dopant can thermally stabilise alumina and, hence, the first support material. It is to be understood that any reference to "doped" in this context refers to a material where the bulk or host lattice of the alumina is substitution doped or interstitially doped with a dopant. In some instances, small amounts of the dopant may be present at a surface of the alumina. However, most of the dopant will generally be present in the body of the alumina.

When the alumina is doped, then typically the total amount of dopant is 0.1 to 5% by weight (i.e. % by weight of the alumina). It is preferred that the total amount of dopant is 0.25 to 2.5% by weight, more preferably 0.5 to 1.5% by weight (e.g. about 1% by weight).

The alumina may be doped with a dopant comprising silicon (Si), magnesium (Mg), barium (Ba), lanthanum (La), cerium (Ce), titanium (Ti), or zirconium (Zr) or a combination of two or more thereof. The dopant may comprises, or consist essentially of, an oxide of silicon, an oxide of magnesium, an oxide of barium, an oxide of lanthanum, an oxide of cerium, an oxide of titanium or an oxide of zirconium. Preferably, the dopant comprises, or consists essentially of, silicon, magnesium, barium, or cerium, or an oxide thereof, particularly silicon, or cerium, or an oxide thereof. More preferably, the dopant comprises, or consists essentially of, silicon, magnesium, or barium, or an oxide thereof; particularly silicon, or magnesium, or an oxide thereof; especially silicon or an oxide thereof.

Examples of alumina doped with a dopant include alumina doped with silica, alumina doped with magnesium oxide, alumina doped with barium or barium oxide, alumina doped with lanthanum oxide, or alumina doped with ceria, particularly alumina doped with silica, alumina doped with lanthanum oxide, or alumina doped with ceria. It is preferred that the alumina doped with a dopant is alumina doped with silica, alumina doped with barium or barium oxide, or alumina doped with magnesium oxide. More preferably, the alumina doped with a dopant is alumina doped with silica or alumina doped with magnesium oxide. Even more preferably, the alumina doped with a dopant is alumina doped with silica. Alumina doped with a dopant can be prepared using methods known in the art or, for example, by a method described in U.S. Pat. No. 5,045,519.

When the alumina is alumina doped with silica, then the alumina is doped with silica in a total amount of 0.5 to 45% by weight (i.e. % by weight of the alumina), preferably 1 to 40% by weight, more preferably 1.5 to 30% by weight (e.g. 1.5 to 10% by weight), particularly 2.5 to 25% by weight, more particularly 3.5 to 20% by weight (e.g. 5 to 20% by weight), even more preferably 4.5 to 15% by weight.

When the alumina is alumina doped with magnesium oxide, then the alumina is doped with magnesium in an amount as defined above or an amount of 1 to 30% by weight (i.e. % by weight of the alumina), preferably 5 to 25% by weight.

The first support material may comprise, or consist essentially of, an alkaline earth metal aluminate. The term "alkaline earth metal aluminate" generally refers to a compound of the formula $MAl_2O_4$ where "M" represents the alkaline earth metal, such as Mg, Ca, Sr or Ba. Such compounds generally comprise a spinel structure. These compounds can be prepared using conventional methods well known in the art or, for example, by using a method described in EP 0945165, U.S. Pat. No. 6,217,837 or U.S. Pat. No. 6,517,795.

Typically, the alkaline earth metal aluminate is magnesium aluminate ($MgAl_2O_4$), calcium aluminate ($CaAl_2O_4$), strontium aluminate ($SrAl_2O_4$), or barium aluminate ($BaAl_2O_4$), or a mixture of two or more thereof. Preferably, the alkaline earth metal aluminate is magnesium aluminate ($MgAl_2O_4$).

The first support material may preferably comprise, or consists essentially of, alumina (e.g. $\gamma$-alumina), which is not doped. The inclusion of a dopant in the first support material may decrease the catalytic activity of the first composition.

Typically, the first catalyst or the first composition, preferably the first catalyst, comprises an amount of the first support material of 0.1 to 4.0 g in$^{-3}$ (e.g. 0.25 to 3.5 g in$^{-3}$), preferably 0.3 to 3.0 g in$^{-3}$, still more preferably 0.5 to 2.7 g in$^{-3}$, and even more preferably 0.6 to 2.5 g in$^{-3}$ (e.g. 0.75 to 2.3 g in$^{-3}$).

The first catalyst or the first composition, preferably the first catalyst, comprises a total loading of the first support material. The second catalyst or the second composition, preferably the second catalyst, comprises a total loading of the second support material. Preferably, the total loading of the first support material is less than the total loading of the second support material.

In principle, the first catalyst or the first composition may comprise a plurality of support materials, including the first support material. However, it is generally preferred that the first catalyst or the first composition comprises a single support material, which is the first support material.

The first catalyst and the second catalyst will each comprise a total loading of alumina. Generally, it is preferred that the total loading of alumina of the first catalyst is less than the total loading of alumina of the second catalyst. The total loading of alumina of the first catalyst may be less than 95%, preferably less than 90%, of the total loading of alumina of the second catalyst.

Typically, the first platinum group metal (PGM) is disposed or supported on the first support material. The first PGM may be disposed directly onto or is directly supported by the first support material (e.g. there is no intervening support material between the first PGM and the first support material). For example, the first PGM can be dispersed on the first support material and/or impregnated into the first support material.

Generally, the first platinum group metal (PGM) is selected from the group consisting of platinum, palladium, gold and a combination of two or more thereof. The first PGM may comprise or consist essentially of platinum. The first PGM may comprise or consist essentially of palladium. The first PGM may comprise or consist essentially of a combination of platinum and palladium. The first PGM may comprise or consist essentially of a combination of palladium and gold, preferably an alloy of palladium and gold.

Typically, the first catalyst or the first composition, preferably the first catalyst, has a total amount of the first PGM is 10 to 300 g ft$^{-3}$, more preferably 20 to 250 g ft$^{-3}$, still more preferably, 25 to 200 g ft$^{-3}$, and even more preferably 35 to 150 g ft$^{-3}$.

When the first platinum group metal (PGM) comprises or consists essentially of a combination of platinum and palladium, then the ratio by weight of platinum to palladium is preferably 10:1 to 1:2, more preferably 5:1 to 1:15, even more preferably 4:1 to 1:1, such as 3:1 to 1.5:1.

The first catalyst comprises a total loading of the first PGM. The second catalyst comprises a total loading of PGM (i.e. the second PGM). Preferably, the total loading of the first PGM is less than the total loading of PGM of the second catalyst.

The first composition may further comprise an alkaline earth metal. The alkaline earth metal may be selected from magnesium (Mg), calcium (Ca), strontium (Sr), barium (Ba) or a combination of two or more thereof. The alkaline earth metal is preferably calcium (Ca), strontium (Sr), or barium (Ba), more preferably strontium (Sr) or barium (Ba), and most preferably the alkaline earth metal is barium (Ba).

The first catalyst or the first composition may further comprise a hydrocarbon adsorbent. The hydrocarbon adsorbent may be selected from a zeolite, active charcoal, porous graphite and a combination of two or more thereof. It is preferred that the hydrocarbon adsorbent is a zeolite. More preferably, the zeolite is a medium pore zeolite (e.g. a zeolite having a maximum ring size of eight tetrahedral atoms) or a large pore zeolite (e.g. a zeolite having a maximum ring size of ten tetrahedral atoms). Examples of suitable zeolites or types of zeolite include faujasite, clinoptilolite, mordenite, silicalite, ferrierite, zeolite X, zeolite Y, ultrastable zeolite Y, AEI zeolite, ZSM-5 zeolite, ZSM-12 zeolite, ZSM-20 zeolite, ZSM-34 zeolite, CHA zeolite, SSZ-3 zeolite, SAPO-5 zeolite, offretite, a beta zeolite or a copper CHA zeolite. The zeolite is preferably ZSM-5, a beta zeolite or a Y zeolite.

When the first catalyst comprises a hydrocarbon adsorbent, then typically the total amount of hydrocarbon adsorbent is 0.05 to 1.5 g in$^{-3}$, particularly 0.10 to 1.0 g in$^{-3}$, more particularly 0.2 to 0.8 g in$^{-3}$.

The first catalyst of the invention optionally further comprises an oxygen storage material. Such materials are well-known in the art. The oxygen storage material may be selected from ceria ($CeO_2$) and ceria-zirconia ($CeO_2$—$ZrO_2$), such as a ceria-zirconia solid solution.

It is generally preferred that the first catalyst does not comprise rhodium (Rh). Rhodium is commonly included in three-way catalysts for spark ignition engines, such as gasoline engines. The present invention is, however, primarily concerned with compression ignition engines, such as diesel engines.

It is further preferred that the first catalyst does not comprise rhodium (Rh), a hydrocarbon adsorbent, an alkali metal (e.g. Li, Na, K) and an alkaline earth metal (e.g. Mg, Ca, Sr, Ba).

The second composition may comprise, or consist of, a single layer. Alternatively, the second composition may comprise a plurality of layers.

When the second composition comprises a plurality of layers, then a first layer may be disposed (i.e. directly disposed) onto the substrate, and a second layer may be disposed on the first layer.

Additionally or alternative, when the second composition comprises a plurality of layers, then a first layer may be disposed on the substrate and a second layer may be disposed on the substrate. The first layer and the second layer may be disposed side-by-side on the substrate. For example, the first layer may be disposed upstream of the second layer. A part or portion (e.g. not all) of either (a) the first layer may be disposed on the second layer or (b) the second layer may be disposed on the first layer. In such an arrangement, there is an overlap between the first and second layers.

If the second composition comprises a plurality of layers, then at least one layer (e.g. the first layer and/or the second layer) comprises the second PGM and at least one layer (e.g. the first layer and/or the second layer) comprises alumina, preferably a second support material comprising alumina. It is preferred that the same layer (e.g. the first layer or second layer) comprises the second PGM and the second support material.

The second catalyst comprises a substrate. The substrate of the second catalyst is not an electrically heatable substrate (e.g. it is not an electrically heating substrate, in use). The second catalyst does not comprise an electrical power connection for electrically heating the substrate. The substrate of the second catalyst does not comprise a heating disk.

The substrate of the second catalyst typically has a cell density of 200 to 800 cpsi, preferably 250 to 700 cpsi, more preferably 300 to 600 cpsi.

Typically, the substrate is a monolith (also referred to herein as a substrate monolith). Such monoliths are well-known in the art. The substrate monolith may be a flow-through monolith or a filtering monolith. It is preferred that the substrate monolith is a flow-through monolith.

A flow-through monolith typically comprises a honeycomb monolith (e.g. a metal or ceramic honeycomb monolith) having a plurality of channels extending therethrough, which channels are open at both ends. When the substrate is a flow-through monolith, then the second catalyst is typically a diesel oxidation catalyst (DOC) or is for use as a diesel oxidation catalyst (DOC).

The filtering monolith may be a partial filter substrate monolith or a wall flow filter substrate monolith. It is preferred that the filtering monolith is a wall flow filter substrate monolith.

Typically, a partial filter substrate monolith has a collecting element (e.g. for particulate matter, such as soot particles) and a plurality of channels (i.e. for exhaust gas to flow through), wherein each channel has at least one open end (preferably each channel has two open ends (i.e. each channel has both ends open)).

In general, the partial filter substrate monolith has a plurality of walls that define the boundaries of the channels. Typically, the collecting element is a plurality of deflections in the plurality of the walls. Each wall may have no deflections or one or more deflections. Each deflection acts as an obstruction to any particulate matter in the exhaust gas that flows through the substrate monolith. Each deflection may have a flap or a wing-like shape and, typically, each deflection projects outwards from (e.g. at an angle to) the plane of the wall. It is preferred that each deflection is combined with an opening in a wall of the substrate monolith. Each opening in a wall allows the exhaust gas to flow from one channel to a neighbouring channel. Partial filter substrate monoliths are disclosed in WO 01/80978 and EP 1057519.

A wall flow filter substrate monolith generally comprises a plurality of inlet channels and a plurality of outlet channels, wherein the inlet channels are open at an upstream end (i.e. exhaust gas inlet side) and are plugged or sealed at a downstream end (i.e. exhaust gas outlet side), the outlet channels are plugged or sealed at an upstream end and are open at a downstream end, and wherein each inlet channel is separated from an outlet channel by a porous structure. When the substrate is a wall flow filter substrate monolith, then the second catalyst of the invention is typically a catalysed soot filter (CSF) or is for use as a catalysed soot filter (CSF).

In a wall-flow filter substrate monolith, each inlet channel is alternately separated from an outlet channel by a wall of the porous structure and vice versa. It is preferred that the inlet channels and the outlet channels are arranged in a honeycomb arrangement. When there is a honeycomb arrangement, it is preferred that the channels vertically and laterally adjacent to an inlet channel are plugged at an upstream end and vice versa (i.e. the channels vertically and laterally adjacent to an outlet channel are plugged at a downstream end). When viewed from either end, the alternately plugged and open ends of the channels take on the appearance of a chessboard.

In principle, the substrate of the second catalyst may be of any shape or size. However, the shape and size of the substrate is usually selected to optimise exposure of the catalytically active materials in the catalyst to the exhaust gas. The substrate may, for example, have a tubular, fibrous or particulate form. Examples of suitable supporting substrates include a substrate of the monolithic honeycomb cordierite type, a substrate of the monolithic honeycomb SiC type, a substrate of the layered fibre or knitted fabric type, a substrate of the foam type, a substrate of the crossflow type, a substrate of the metal wire mesh type, a substrate of the metal porous body type and a substrate of the ceramic particle type.

The second composition is disposed on the substrate of the second catalyst, preferably the channel walls of the substrate. The second composition is typically disposed on the substrate by coating a washcoat (e.g. a washcoat comprising a second composition) onto the substrate.

In the emissions control device of the invention, the second composition comprises alumina and a second platinum group metal (PGM). In general, it is preferred that the second composition comprises a second PGM and a second support material, wherein the second support material comprises alumina. The second composition may consist of or consist essentially of a second PGM and a second support material.

The second support material may comprise, or consists essentially of, a mixed oxide of alumina and a refractory oxide or a composite oxide of alumina and a refractory oxide, wherein the refractory oxide is selected from the group consisting of silica, titania, zirconia and ceria. It is preferred that the refractory oxide is silica.

When the second support material comprises, or consists essentially of, a mixed oxide of alumina and a refractory oxide or a composite oxide of alumina and a refractory oxide, then preferably the second support material (e.g. the mixed oxide or the composite oxide) comprises at least 50 to 99% by weight of alumina, more preferably 70 to 95% by weight of alumina, even more preferably 75 to 90% by weight of alumina.

The second support material comprises alumina or may consist essentially of alumina. The alumina can be $\alpha$-$Al_2O_3$, $\beta$-$Al_2O_3$, or $\gamma$-$Al_2O_3$. It is preferred that the alumina comprises, or consists essentially of, $\gamma$-$Al_2O_3$.

The second support material may comprise alumina doped with a dopant. The inclusion of a dopant can thermally stabilise alumina and, hence, the second support material. When the alumina is doped, then typically the total amount of dopant is 0.1 to 5% by weight (i.e. % by weight of the alumina). It is preferred that the total amount of dopant is 0.25 to 2.5% by weight, more preferably 0.5 to 1.5% by weight (e.g. about 1% by weight).

The alumina may be doped with a dopant comprising silicon (Si), magnesium (Mg), barium (Ba), lanthanum (La), cerium (Ce), titanium (Ti), or zirconium (Zr) or a combination of two or more thereof. The dopant may comprises, or consist essentially of, an oxide of silicon, an oxide of magnesium, an oxide of barium, an oxide of lanthanum, an oxide of cerium, an oxide of titanium or an oxide of zirconium. Preferably, the dopant comprises, or consists essentially of, silicon, magnesium, barium, or cerium, or an oxide thereof, particularly silicon, or cerium, or an oxide thereof. More preferably, the dopant comprises, or consists essentially of, silicon, magnesium, or barium, or an oxide thereof; particularly silicon, or magnesium, or an oxide thereof; especially silicon or an oxide thereof.

Examples of alumina doped with a dopant include alumina doped with silica, alumina doped with magnesium oxide, alumina doped with barium or barium oxide, alumina doped with lanthanum oxide, or alumina doped with ceria, particularly alumina doped with silica, alumina doped with lanthanum oxide, or alumina doped with ceria. It is preferred that the alumina doped with a dopant is alumina doped with silica, alumina doped with barium or barium oxide, or alumina doped with magnesium oxide. More preferably, the alumina doped with a dopant is alumina doped with silica or alumina doped with magnesium oxide. Even more preferably, the alumina doped with a dopant is alumina doped with silica.

When the alumina is alumina doped with silica, then the alumina is doped with silica in a total amount of 0.5 to 45% by weight (i.e. % by weight of the alumina), preferably 1 to 40% by weight, more preferably 1.5 to 30% by weight (e.g. 1.5 to 10% by weight), particularly 2.5 to 25% by weight, more particularly 3.5 to 20% by weight (e.g. 5 to 20% by weight), even more preferably 4.5 to 15% by weight.

When the alumina is alumina doped with magnesium oxide, then the alumina is doped with magnesium in an amount as defined above or an amount of 1 to 30% by weight (i.e. % by weight of the alumina), preferably 5 to 25% by weight.

The second support material may comprise, or consist essentially of, an alkaline earth metal aluminate (e.g. a compound of the formula $MAl_2O_4$ where "M" represents the alkaline earth metal, such as Mg, Ca, Sr or Ba). Such compounds generally comprise a spinel structure.

Typically, the alkaline earth metal aluminate is magnesium aluminate ($MgAl_2O_4$), calcium aluminate ($CaAl_2O_4$), strontium aluminate ($SrAl_2O_4$), or barium aluminate ($BaAl_2O_4$), or a mixture of two or more thereof. Preferably, the alkaline earth metal aluminate is magnesium aluminate ($MgAl_2O_4$).

The second support material may preferably comprise, or consists essentially of, alumina (e.g. γ-alumina), which is not doped. The inclusion of a dopant in the second support material may decrease the catalytic activity of the second composition.

Typically, the second catalyst comprises an amount of the second support material of 0.1 to 4.5 g in$^{-3}$ (e.g. 0.25 to 4.2 g in$^{-3}$), preferably 0.3 to 4.0 g in$^{-3}$, still more preferably 0.5 to 3.5 g in$^{-3}$, and even more preferably 1.0 to 3.0 g in$^{-3}$ (e.g. 1.3 to 2.5 g in$^{-3}$).

The second catalyst or the second composition may comprise a plurality of support materials (i.e. including the second support material), particularly when the second composition comprises a plurality of layers.

The second catalyst or the second composition may comprise a single support material, which is the second support material.

Typically, the second platinum group metal (PGM) is disposed or supported on the second support material. The second PGM may be disposed directly onto or is directly supported by the second support material (e.g. there is no intervening support material between the second PGM and the second support material). For example, the second PGM can be dispersed on the second support material and/or impregnated into the second support material.

Generally, the second platinum group metal (PGM) is selected from the group consisting of platinum, palladium, gold and a combination of two or more thereof. The second PGM may comprise or consist essentially of platinum. The second PGM may comprise or consist essentially of palladium. The second PGM may comprise or consist essentially of a combination of platinum and palladium. The second PGM may comprise or consist essentially of a combination of palladium and gold, preferably an alloy of palladium and gold.

Typically, the total amount of the second PGM is 10 to 300 g ft$^{-3}$, more preferably 20 to 250 g ft$^{-3}$, still more preferably, 25 to 200 g ft$^{-3}$, and even more preferably 35 to 150 g ft$^{-3}$.

The second catalyst or second composition may further comprise an alkaline earth metal. The alkaline earth metal may be selected from magnesium (Mg), calcium (Ca), strontium (Sr), barium (Ba) or a combination of two or more thereof. The alkaline earth metal is preferably calcium (Ca), strontium (Sr), or barium (Ba), more preferably strontium (Sr) or barium (Ba), and most preferably the alkaline earth metal is barium (Ba).

The second catalyst or second composition may further comprise a hydrocarbon adsorbent. The hydrocarbon adsorbent may be selected from a zeolite, active charcoal, porous graphite and a combination of two or more thereof. It is preferred that the hydrocarbon adsorbent is a zeolite. More preferably, the zeolite is a medium pore zeolite (e.g. a zeolite having a maximum ring size of eight tetrahedral atoms) or a large pore zeolite (e.g. a zeolite having a maximum ring size of ten tetrahedral atoms). Examples of suitable zeolites or types of zeolite include faujasite, clinoptilolite, mordenite, silicalite, ferrierite, zeolite X, zeolite Y, ultrastable zeolite Y, AEI zeolite, ZSM-5 zeolite, ZSM-12 zeolite, ZSM-20 zeolite, ZSM-34 zeolite, CHA zeolite, SSZ-3 zeolite, SAPO-5 zeolite, offretite, a beta zeolite or a copper CHA zeolite. The zeolite is preferably ZSM-5, a beta zeolite or a Y zeolite.

When the second catalyst or the second composition comprises a hydrocarbon adsorbent, then typically the total amount of hydrocarbon adsorbent is 0.05 to 2.2 g in$^{-3}$, particularly 0.10 to 1.2 g in$^{-3}$, more particularly 0.2 to 1.0 g in$^{-3}$.

The second catalyst or second composition optionally further comprises an oxygen storage material. Such materials are well-known in the art. The oxygen storage material may be selected from ceria ($CeO_2$) and ceria-zirconia ($CeO_2$—$ZrO_2$), such as a ceria-zirconia solid solution.

It is generally preferred that the second catalyst does not comprise rhodium (Rh).

Rhodium is commonly included in three-way catalysts for spark ignition engines, such as gasoline engines. The present invention is, however, primarily concerned with compression ignition engines, such as diesel engines.

It is further preferred that the second catalyst does not comprise rhodium (Rh), a hydrocarbon adsorbent, an alkali metal (e.g. Li, Na, K) and an alkaline earth metal (e.g. Mg, Ca, Sr, Ba).

Methods for preparing the first catalyst and the second catalyst are known in the art. See, for example, our WO 99/47260, WO 2007/077462 and WO 2011/080525.

In general, the first catalyst is disposed upstream of the second catalyst (e.g. immediately or directly upstream). The exhaust gas produced by the compression ignition engine will be brought into contact with the first catalyst before the second catalyst. It is preferred that the exhaust gas produced by the compression ignition engine is directly brought into contact with the emissions control device of the invention. Thus, the exhaust gas is first brought into contact with the emissions control device of the invention before any other emissions control device.

The first catalyst is typically separated from the second catalyst, such as by a gap. It is preferred that the gap is an electrically isolating gap between the first catalyst and the second catalyst. This is to prevent the second catalyst from being in electrical contact with the first catalyst.

The gap may have a length of 1 mm to 50 mm, as measured in the direction of the axial length of the electrically heatable substrate and the substrate of the second catalyst. It is preferred that the gap has a length of 1 mm to 10 mm. This allows heat to be readily transferred from the first catalyst to the second catalyst.

When the first catalyst is separated from the second catalyst, such as by a gap, then generally there is no intervening emissions control device between the first catalyst and the second catalyst (i.e. in the gap). The second catalyst directly follows the first catalyst.

The emissions control device typically comprises a casing, wherein the first catalyst and the second catalyst are disposed within the casing. The casing may have one or more marking to denote the inlet end and/or the outlet end of the emissions control device.

The casing may comprise an electrically insulating supporting element for each electrical power connection. Each electrical power connection of the first catalyst may pass through an electrically insulating supporting element.

The casing may comprise or consist essentially of a metallic sleeve.

The invention also provides an exhaust system comprising the emissions control device. The exhaust system may further comprise an electrical power source. The electrical power source may be electrically connected to each electrical power connection (i.e. of the first catalyst).

There may be a switch connected between the electrical power source and an electrical power connection. The switch may allow electrical current to pass from the electrical power source to the first catalyst before the compression ignition engine has started (e.g. from 1 to 2 seconds before the compression ignition) or simultaneously with the start of the compression ignition engine.

The electrical power supply may be an 8 to 28 volt electrical power supply, preferably a 12 to 24 volt electrical power supply.

The exhaust system may comprise a temperature sensor, preferably a plurality of temperature sensors. Each temperature sensor may be a thermocouple.

A temperature sensor (i.e. a first temperature sensor) may be located upstream of the first catalyst. This temperature sensor may be electrically connected to a switch. For example, it may be electrically connected to a switch, such that the switch closes when the temperature sensor detects a temperature of the exhaust gas below a temperature limit (i.e. a first temperature limit). When the switch is closed, electrical current may pass from the electrical power source to the first catalyst. The sensor may trigger electrical heating of the first catalyst when the exhaust gas temperature is below the effective temperature of the first catalyst.

A temperature sensor (i.e. a second temperature sensor) may be located between the first catalyst and the second catalyst. This temperature sensor may be electrically connected to a switch. For example, it may be electrically connected to a switch, such that the switch opens when the temperature sensor detects a temperature of the exhaust gas above a temperature limit (e.g. a second temperature limit). When the switch is opened, the electrical circuit between the electrical power source and the first catalyst is broken. The sensor may stop electrical heating of the first catalyst once it has reached a certain temperature, such as the temperature at which the first catalyst is effective.

Additionally or alternatively, the or each temperature sensor may be electrically connected to a control module. The or each temperature sensor may provide information for on-board diagnostic (OBD) purposes.

The emissions control device of the invention may be locatable between 0.1 meters and 10 meters, such as 0.5 meters to 4 meters, as measured by gas flow length, from the exit of the exhaust gas from the engine (e.g. the outlet of an engine manifold). As the emissions control device of the invention can be heated up electrically, it does not have to be positioned in an exhaust system in a close-coupled position. This is advantageous because the emissions control device does not have to be located in the restricted space for the engine in a vehicle.

The invention also provides an exhaust system comprising the emissions control device and at least one second emissions control device. In general, the emissions control device is upstream of the second emissions control device. For the avoidance of doubt, the emissions control device is separate to the second emissions control device.

It is preferred that the exhaust system does not comprise a hydrocarbon adsorber upstream of the emissions control device of the invention.

The first catalyst is typically directly coupled to an exhaust gas outlet of the compression ignition engine. In such an arrangement, there is no intervening emissions control device between the exhaust gas outlet of the compression ignition engine and the first catalyst. The exhaust gas produced by the compression ignition engine passes directly to the first catalyst in the exhaust system.

Each additional emissions control device, such as the second emissions control device, may be selected from a diesel particulate filter (DPF), a $NO_x$ adsorber catalyst (NAC), a lean $NO_x$ catalyst (LNC), a selective catalytic reduction (SCR) catalyst, a diesel oxidation catalyst (DOC), a catalysed soot filter (CSF), a selective catalytic reduction filter (SCRF™) catalyst, and combinations of two or more thereof. Emissions control devices represented by the terms diesel particulate filters (DPFs), $NO_x$ adsorber catalysts (NACs), lean $NO_x$ catalysts (LNCs), selective catalytic reduction (SCR) catalysts, diesel oxidation catalyst (DOCs), catalysed soot filters (CSFs) and selective catalytic reduction filter (SCRF™) catalysts are all well known in the art.

In a first exhaust system embodiment, the exhaust system comprises the emissions control device of the invention and either a diesel particulate filter (DPF) or a catalysed soot filter (CSF). The emissions control device is typically followed by (e.g. is upstream of) the diesel particulate filter (DPF) or the catalysed soot filter (CSF). Thus, for example, an outlet of the emissions control device is connected to an inlet of the diesel particulate filter or the catalysed soot filter.

In a second exhaust system embodiment, the exhaust system comprises the emissions control device of the invention and a selective catalytic reduction (SCR) catalyst. The emissions control device of the invention is typically followed by (e.g. is upstream of) the selective catalytic reduction (SCR) catalyst.

A third exhaust system embodiment comprises the emissions control device of the invention and a selective catalytic reduction filter (SCRF™) catalyst. The emissions control device of the invention is typically followed by (e.g. is upstream of) the selective catalytic reduction filter (SCRF™) catalyst A fourth exhaust system embodiment relates to an exhaust system comprising the emissions control device of the invention, a diesel particulate filter or a catalysed soot filter (CSF), and a selective catalytic reduction (SCR) catalyst. This arrangement is a preferred exhaust system for a light-duty diesel vehicle. The emissions control device is typically followed by (e.g. is upstream of) the diesel particulate filter or the catalysed soot filter (CSF). The DPF or CSF is typically followed by (e.g. is upstream of) the selective catalytic reduction (SCR) catalyst.

In a fifth exhaust system embodiment, the exhaust system comprises the emissions control device of the invention, a selective catalytic reduction (SCR) catalyst and either a catalysed soot filter (CSF) or a diesel particulate filter (DPF). The emissions control device of the invention is typically followed by (e.g. is upstream of) the selective catalytic reduction (SCR) catalyst. The selective catalytic reduction (SCR) catalyst is typically followed by (e.g. are upstream of) the catalysed soot filter (CSF) or the diesel particulate filter (DPF).

A nitrogenous reductant injector may be directly upstream of the selective catalytic reduction (SCR) catalyst or the selective catalyst reduction filter (SCRF™) catalyst. Thus, in the second, third and fifth exhaust system embodiments, the emissions control device may be followed by (e.g. is upstream of) the nitrogenous reductant injector, and the nitrogenous reductant injector may be followed by (e.g. is upstream of) the SCR catalyst or the SCRF™ catalyst. In the fourth exhaust system embodiment, the DPF or CSF may be followed by (e.g. is upstream of) a nitrogenous reductant injector, and the nitrogenous reductant injector may be followed by (e.g. is upstream of) the selective catalytic reduction (SCR) catalyst.

The invention further provides a vehicle comprising a compression ignition engine and either an exhaust system of the invention or an emissions control device of the invention. Typically, the emissions control device is located downstream of the compression ignition engine, such as downstream of a turbo of the compression ignition engine.

The compression ignition engine is preferably a diesel engine.

The compression ignition engine or the vehicle may further comprise a control module. The control module may include control logic for on-board diagnostics (OBDs).

Generally, the control module is operably connected (e.g. electrically connected) to the first catalyst, particularly the electrically heatable substrate, more preferably the heating disk.

The control module is preferably in communication with the or each temperature sensor (e.g. the first temperature sensor and/or the second temperature sensor).

The control module may include control logic for monitoring the or each temperature sensor (e.g. the first temperature sensor and/or the second temperature sensor) and/or for calculating a temperature profile of the emissions control device (e.g. the temperatures at which the electrically heatable substrate should be activated or deactivated). The control module may include control logic for selectively activating or deactivation the emissions control device based on the temperature of the exhaust gas).

The vehicle typically comprises an electrical power source, such as an alternator and/or battery. It is preferred that the electrical power source for the first catalyst is the alternator and/or battery (e.g. of the vehicle).

The vehicle may be a light-duty diesel vehicle (LDV), such as defined in US or European legislation. A light-duty diesel vehicle typically has a weight of <2840 kg, more preferably a weight of <2610 kg.

In the US, a light-duty diesel vehicle (LDV) refers to a diesel vehicle having a gross weight of ≤8,500 pounds (US lbs). In Europe, the term light-duty diesel vehicle (LDV) refers to (i) passenger vehicles comprising no more than eight seats in addition to the driver's seat and having a maximum mass not exceeding 5 tonnes, and (ii) vehicles for the carriage of goods having a maximum mass not exceeding 12 tonnes.

Alternatively, the vehicle may be a heavy-duty diesel vehicle (HDV), such as a diesel vehicle having a gross weight of >8,500 pounds (US lbs), as defined in US legislation.

DEFINITIONS

The term "mixed oxide" as used herein generally refers to a mixture of oxides in a single phase, as is conventionally known in the art. The term "composite oxide" as used herein generally refers to a composition of oxides having more than one phase, as is conventionally known in the art.

The acronym "PGM" as used herein refers to "platinum group metal". The term "platinum group metal" generally refers to the metals Ru, Rh, Pd, Os, Ir and Pt of the Periodic Table, particularly the metals Ru, Rh, Pd, Ir and Pt.

Any reference herein to an amount in units of g ft$^{-3}$ (grams per cubic foot) or g in$^{-3}$ (grams per cubic inch) etc. refer to the mean weight of a component per volume of the substrate.

The expression "consisting essentially" used herein limits the scope of a feature to include the specified materials or steps, and any other materials or steps that do not materially affect the basic characteristics of that feature, such as for example minor impurities. The expression "consisting essentially of" embraces the expression "consisting of".

EXAMPLES

The invention will now be illustrated by the following non-limiting example.

Substrates

Figure 2:
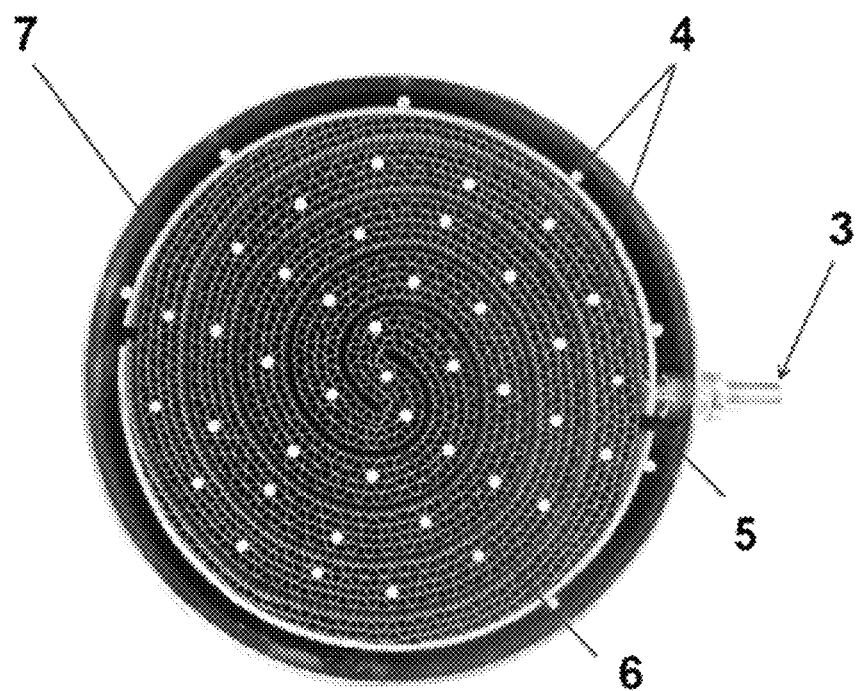
FIG. 2 shows the end face (e.g. front face from the inlet side of the emissions control device) of an electrically heatable substrate

Two substrates were used in each of Examples 1 and 2 for the manufacture of an emissions control device. The first substrate (1) had an electrical heating capability (e.g. a heater element) and a cell density of 160 cpsi. The end face of the first substrate (1) that was used is shown in FIG. 2. The first substrate (1) comprises a honeycomb body formed of corrugated sheet metal layers. The corrugated sheet metal layers are held in coiled position by a series of holding pins (4) and there is an air gap (6) between the layers. There is also a plug arm or electrode (3) for connecting the first substrate (1) to an electrical power supply. When the emissions control device has been assembled, there is an air gap (7) between the first substrate and the outer casing.

The second substrate (2) did not have an electrical heating capability and had a cell density of 600 cpsi. The second substrate was a honeycomb monolith of the type is commonly used in a diesel oxidation catalyst.

Both substrates were housed within the same outer metallic sleeve such that only one face of each substrate was exposed. The first substrate (1) was housed at the front, inlet end of the metallic sleeve and the second substrate was housed at the rear, outlet end of the metallic sleeve (as shown in FIG. 1).

Example 1

Coating the First, Electrically Heatable Substrate (Coating 1)

Alumina powder was slurried in water and milled to a $d_{90}$<20 micron. Soluble salts of platinum and palladium were added and the slurry stirred to homogenise. The resulting washcoat was applied using established coating techniques to the open face of the first substrate with 160 cpsi. The coating was subsequently dried.

Coating the Second Substrate (Coating 2)

A second washcoat was prepared using the same method that was used for Coating 1 except that the slurry had a higher content of alumina. This coating was applied using established coating techniques to the open face of the second substrate with 600 cpsi. The coating was subsequently dried and the whole part was calcined at 500° C.

The final coating loading on the first substrate was 1.3 g in$^{-3}$. The final coating loading on the second substrate was 1.8 g in$^{-3}$.

Example 2

Coating the First, Electrically Heatable Substrate (Coating 3)

A silica-alumina powder was slurried in water and milled to a $d_{90}$<20 micron. Soluble salts of platinum and palladium were added and the slurry stirred to homogenise. The resulting washcoat was applied using established coating techniques to the open face of the first substrate with 160 cpsi. The coating was subsequently dried.

Coating the Second Substrate (Coating 4)

A second washcoat was prepared using the same method that was used for Coating 3 except that the slurry had a higher content of alumina. This coating was applied using established coating techniques to the open face of the second substrate with 600 cpsi. The coating was subsequently dried and the whole part calcined at 500° C.

The final coating loading on the first substrate was 2.0 g in$^{-3}$. The final coating loading on the second substrate was 2.8 g in$^{-3}$.

The invention claimed is:

1. An emissions control device for a compression ignition engine comprising:
   (a) a first catalyst comprising an electrically heatable substrate and a first composition disposed on the electrically heatable substrate, wherein the electrically heated substrate comprises a metal monolith, the first catalyst comprises an electrical power connection and the first composition comprises a first support material comprising alumina and a first platinum group metal (PGM) selected from the group consisting of platinum, palladium, gold and a combination of two or more thereof; and
   (b) a second catalyst comprising a substrate and a second composition disposed on the substrate, wherein the second composition comprises a second support material comprising alumina, and a second platinum group metal (PGM) selected from the group consisting of platinum, palladium, gold and a combination of two or more thereof, and wherein the substrate does not comprise a power connection for electrically heating the substrate;
   wherein the loading of the first composition is less than the loading of the second composition; and wherein the first catalyst is disposed upstream of the second catalyst.

2. An emissions control device according to claim 1, wherein the total loading of alumina of the first catalyst is less than the total loading of alumina of the second catalyst.

3. An emissions control device according to claim 1, wherein the first catalyst is separated from the second catalyst by an electrically isolating gap between the first catalyst and the second catalyst.

4. An emissions control device according to claim 1, wherein the first support material comprises a mixed oxide of alumina and a refractory oxide or a composite oxide of alumina and a refractory oxide.

5. An emissions control device according to claim 1, wherein the first support material comprises at least 50 to 99% by weight of alumina.

6. An emissions control device according to claim 1, wherein the second support material comprises a mixed oxide of alumina and a refractory oxide or a composite oxide of alumina and a refractory oxide.

7. An emissions control device according to claim 1, wherein the second support material comprises at least 50 to 99% by weight of alumina.

8. An emissions control device according to claim 1, wherein the total loading of the first support material is less than the total loading of the second support material.

9. An emissions control device according to claim 1, wherein the total loading of the first PGM is less than the total loading of PGM of the second catalyst.

10. An emissions control device according to claim 1, wherein the substrate of the second catalyst is a flow-through monolith or a filtering monolith.

11. An emissions control device according to claim 1, wherein the substrate of the second catalyst is a substrate of the monolithic honeycomb cordierite type or a substrate of the monolithic honeycomb SiC type.

12. Any exhaust system comprising the emissions control device according to claim 1.

13. A vehicle comprising a compression ignition engine and an exhaust system according to claim 12.

14. An emissions control device for a compression ignition engine comprising:
   (a) a first catalyst comprising an electrically heatable substrate and a first composition disposed on the electrically heatable substrate, wherein the electrically heated substrate comprises a heating disk, the first catalyst comprises an electrical power connection and the first composition comprises a first support material comprising alumina and a first platinum group metal (PGM) selected from the group consisting of platinum, palladium, gold and a combination of two or more thereof; and
   (b) a second catalyst comprising a substrate and a second composition disposed on the substrate, wherein the second composition comprises a second support material comprising alumina, and a second platinum group metal (PGM) selected from the group consisting of platinum, palladium, gold and a combination of two or more thereof, and wherein the substrate does not comprise a heating disk;
   wherein the loading of the first composition is less than the loading of the second composition; and wherein the first catalyst is disposed upstream of the second catalyst.

15. An emissions control device according to claim 1, wherein the electrically heatable substrate has a cell density and the substrate of the second catalyst has a cell density, and the cell density of the electrically heatable substrate of the first catalyst is less than the cell density of the substrate of the second catalyst.

16. An emissions control device according to claim 1, wherein the electrically heatable substrate has an axial length and the substrate of the second catalyst has an axial length, wherein the axial length of the electrically heatable substrate is less than the axial length of the substrate of the second catalyst.

* * * * *